United States Patent [19]

Saulgeot

[11] Patent Number: 4,773,256
[45] Date of Patent: Sep. 27, 1988

[54] INSTALLATION FOR DETECTING A LEAK OF TRACER GAS, AND A METHOD OF USE

[75] Inventor: Claude Saulgeot, Veyrier du Lac, France

[73] Assignee: Alcatel Cit, Paris, France

[21] Appl. No.: 101,211

[22] Filed: Sep. 25, 1987

[30] Foreign Application Priority Data

Sep. 26, 1986 [FR] France ................ 86 13455

[51] Int. Cl.$^4$ ............................................. G01M 3/20
[52] U.S. Cl. .................................................. 73/40.7
[58] Field of Search ............... 73/40.7, 40; 250/288, 250/289

[56] References Cited

U.S. PATENT DOCUMENTS

| | | | |
|---|---|---|---|
| 4,365,158 | 12/1982 | Tallon | 250/288 |
| 4,436,998 | 3/1984 | Tallon | 250/288 |
| 4,472,962 | 9/1984 | Mennenga | 73/40.7 |
| 4,487,058 | 12/1984 | Mennenga | 73/40 |
| 4,510,792 | 4/1985 | Morel et al. | 73/40.7 |
| 4,606,221 | 8/1986 | Tallon et al. | 73/40.7 |
| 4,608,866 | 9/1986 | Bergquist | 73/40.7 |
| 4,683,749 | 8/1987 | Thurlow et al. | 73/40.7 |
| 4,735,084 | 4/1988 | Fuzzetti | 73/40.7 |

FOREIGN PATENT DOCUMENTS 0070341 1/1983 European Pat. Off. .
3144503 5/1983 Fed. Rep. of Germany .

Primary Examiner—Michael J. Tokar
Assistant Examiner—Hezron E. Williams
Attorney, Agent, or Firm—Sughrue, Mion, Zinn, Macpeak & Seas

[57] ABSTRACT

An installation for detecting a leak of a tracer gas, the installation comprises a mechanical primary pump (5) whose inlet is connected firstly to a part (9) under test via a first valve (2), and secondly to the outlet (17) of a turbo-molecular secondary pump (7) via a second valve (3), with the inlet of said turbomolecular pump being connected to the part under test via a third valve (4), and with a spectrometer cell (1) being also connected to the inlet side of said turbomolecular pump. The installation includes the improvement whereby said turbomolecular pump is constituted by two stages in series, with the connection between the two stages having an intermediate inlet orifice (16) connected thereto and also connected to the part under test (9) via a fourth valve (12), with the first stage connected to the spectrometer cell (1) having a high helium compression ratio, and with the second stage connected to the primary pump (5) having a high nitrogen throughput.

2 Claims, 2 Drawing Sheets

4,773,256

INSTALLATION FOR DETECTING A LEAK OF TRACER GAS, AND A METHOD OF USE

FIELD OF THE INVENTION

The present invention relates to an installation for detecting a leak of a tracer gas, the installation comprising a mechanical primary pump whose inlet is connected firstly to a part under test via a first valve, and secondly to the outlet of a turbomolecular secondary pump via a second valve, with the inlet of said turbomolecular pump being connected to the part to be tested via a third valve, and with a spectrometer cell being also connected to the inlet side of said turbomolecular pump.

BACKGROUND OF THE INVENTION

In a prior installation, shown in FIG. 1, operation is as follows:

With the spectrometer cell 1 turned off, and with the first valve 2, the second valve 3, and the third valve 4 all closed, the mechanical primary pump 5 is switched on, and the second valve 3 is opened.

After a few minutes, pressure gauge 6 indicates a pressure of less than 1 mb, and starts up the turbomolecular pump 7.

Once the turbomolecular pump has reached its nominal speed of rotation, the pressure indicated by pressure gauge 8 falls from $10^{-2}$ mb to $10^{-6}$ mb and the filament of the spectrometer cell 1 may be switched on.

The second valve 3 is closed and the first valve 2 is opened. The primary pump 5 then evacuates the part 9 under test. Once the pressure in the part under test, as measured by a pressure gauge 10, falls below 1 mb, the first valve 2 is closed and the second valve 3 is opened.

After a few minutes, the third valve 4 may be opened slowly in such a manner that the pressure indicated by the pressure gauge 8 does not rise above $10^{-4}$ mb. Leakage is measured while the third valve 4 is fully open.

In such an installation, and using the above operating method, it takes a relatively long time to pump out the part 9.

The aim of the present invention is to reduce the time required to pump out the part under test.

SUMMARY OF THE INVENTION

Thus, the invention provides an installation for detecting a leak of tracer gas of the type described above, said installation being characterized in that said turbomolecular pump is constituted by two stages in series, with the connection between the two stages having an intermediate inlet orifice connected thereto and also connected to the part under test via a fourth valve, with the first stage connected to the the spectrometer cell having a high helium compression ratio, and with the second stage connected to the primary pump having a high nitrogen throughput.

BRIEF DESCRIPTION OF THE DRAWINGS

An embodiment of the invention is now described by way of example with reference to the accompanying drawings, in which.

MORE DETAILED DESCRIPTION

Figure 1:
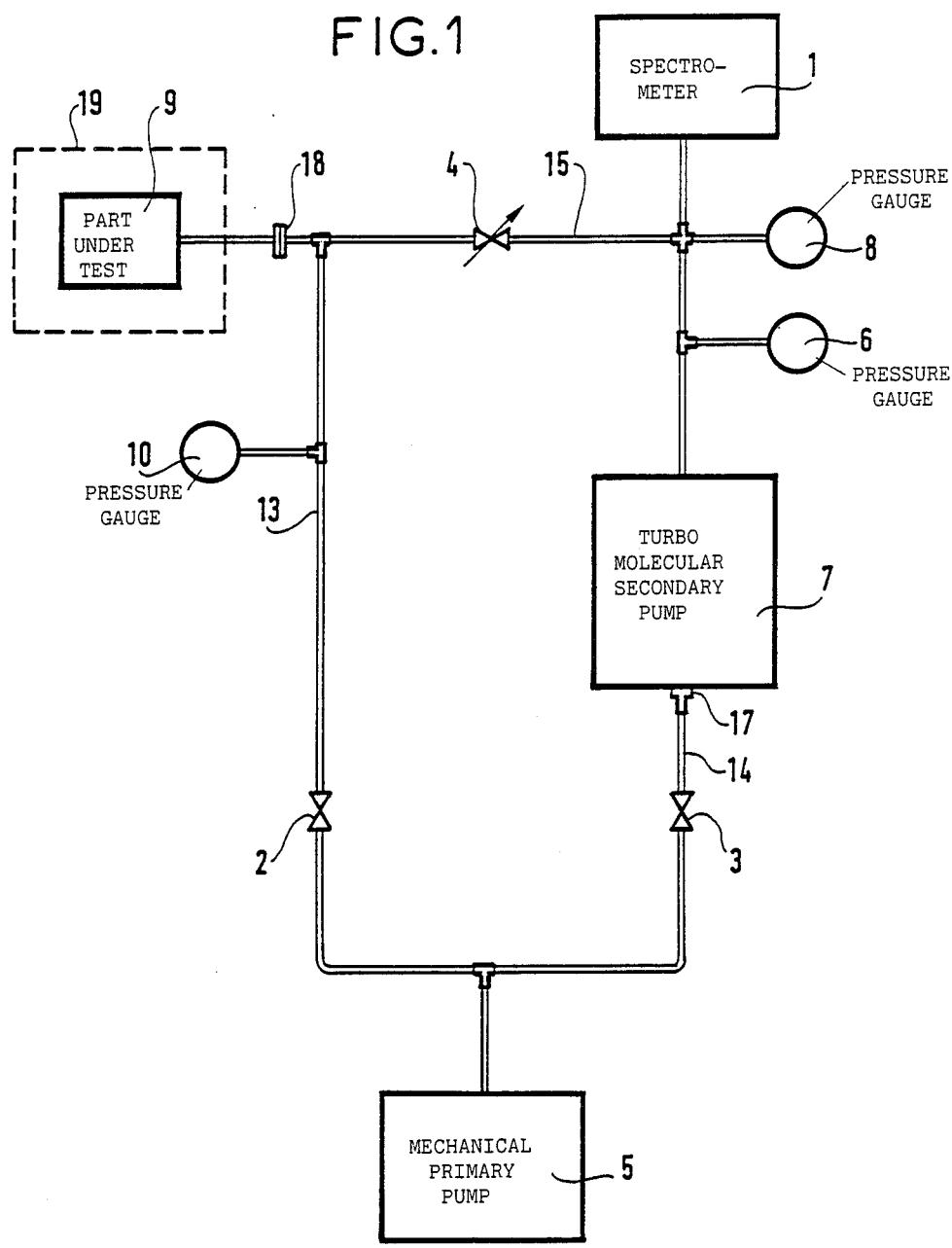
FIG. 1 shows a prior art leak detector installation as described above.
Figure 2:
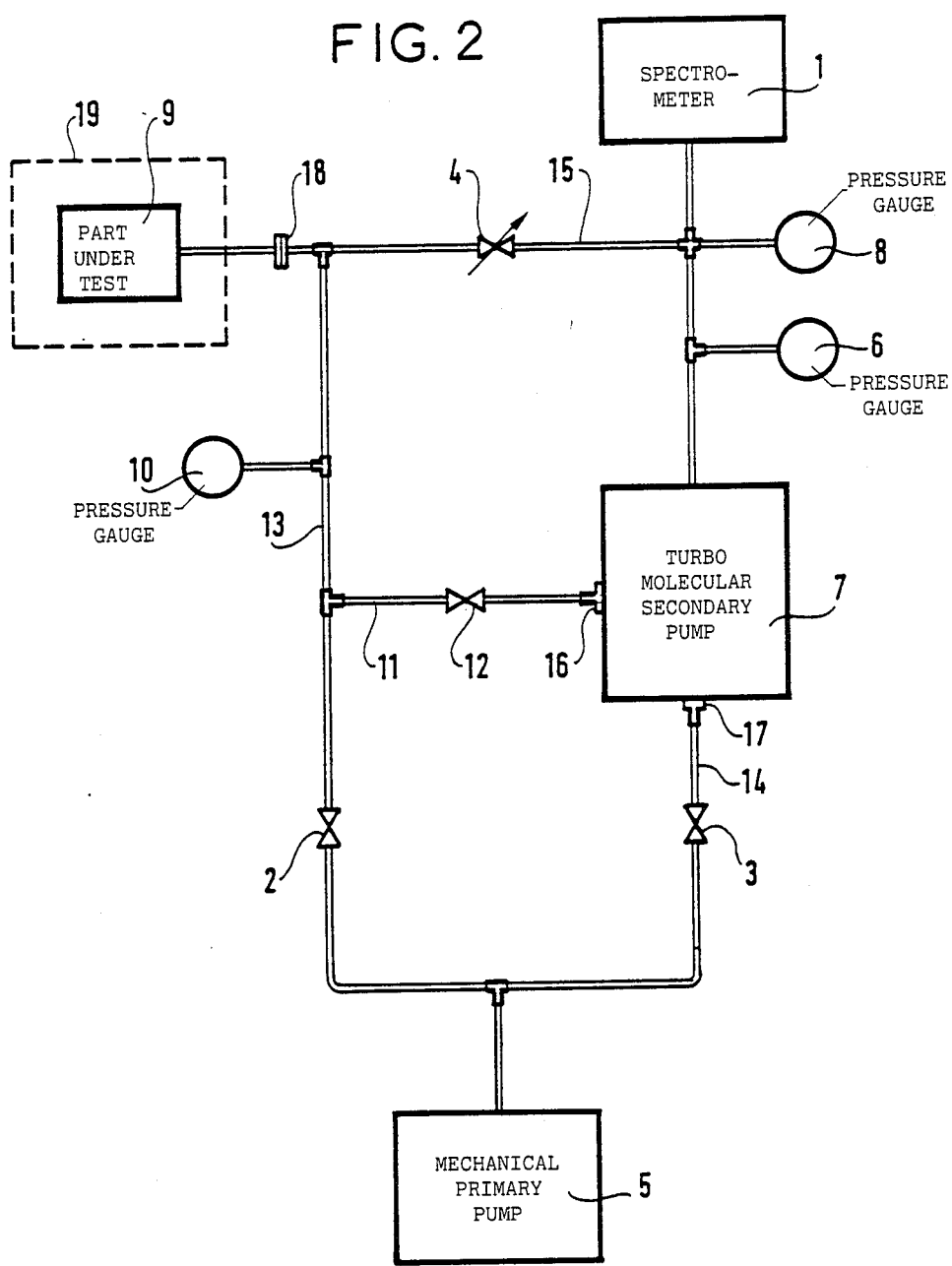
FIG. 2 shows a leak detector installation in accordance with the invention.

With reference to FIG. 2, the installation comprises a mechanical primary pump 5 whose inlet is connected to the part under test 9 via a duct 13 fitted with a first valve 2.

The inlet of the primary pump 5 is also connected via a duct 14 fitted with a second valve 3 to the outlet 17 from a turbomolecular secondary pump 7. The inlet of the turbomolecular pump 7 is connected via a duct 15 fitted with a third valve 4 to the part under test 9, A spectrometer cell 1 is connected to the inlet of the turbomolecular pump 7.

In accordance with the invention, the turbomolecular pump 7 is constituted by two stages in series and includes an intermediate inlet orifice 16 between these two stages, which intermediate orifice is connected via a duct 11 fitted with a fourth valve 12 to the part under test 9.

In addition, the turbomolecular pump 7 is constructed in such a manner that its first stage—which is connected to the spectrometer cell 1 and which lies at the top in the drawing—has a high helium compression ratio in order to reduce background noise to helium in the air and so that its second stage—which is connected to the primary pump 5 and which lies at the bottom in the drawing—has a high nitrogen flow rate in order to reduce the time required for pumping out the part.

Pressure gauges 6, 8, and 10, measure pressures at various points.

The installation operates as follows:

With valves 2, 3, 4, and 12 closed, the primary pump 5 is put into operation, and the second valve 3 is opened. A few seconds later, the pressure gauge 6 indicates a pressure of less than 1 mb and switches on the turbomolecular pump 7. Once its speed of rotation is reached, the pressure indicated by the gauge 8 has fallen to less than $10^{-6}$ mb.

The filament of the spectrometer cell 1 can then be switched on.

The part under test 9 is then connected to the inlet orifice 18 of the installation as a whole which is commonly enclosed in a housing and referred to as a detector.

The tracer gas, e.g. helium, is contained in an enclosure surrounding the part 9 and represented in the figure by dashed lines 19. The part itself contains air at atmospheric pressure.

The part 9 is then evacuated by closing the second valve 3 and by opening the first valve 2. The primary pump 5 evacuates the air from the part 9, and when the gauge 10 indicates that the pressure has dropped to below 1 mb, the first valve 2 is closed and the second and fourth valves 3 and 12 are opened. As a result, the part under test is then evacuated by a portion of the turbomolecular pump 7 together with the primary pump 5 connected in series.

This takes advantage of the high performance of the turbomolecular pump 7 at pressures of less than 1 mb, whereas in the prior art the pumping speed of the primary pump 5 on its own below this pressure is low and falls off progressively down to 35% of its nominal value at a pressure of $10^{-2}$ mb.

When the pressure measured by the gauge 10 falls to $10^{-2}$ mb, the fourth valve 12 is closed, and then after a few minutes, the third valve 4 (which is an inlet valve) is opened slowly and progressively so that the pressure in the cell 1 as indicated by gauge 8 does not rise above $10^{-4}$ mb.

Leakage is measured with valve 4 fully open.

Thus, in comparison with the prior art, a considerable reduction is obtained in the time required to pump out the part under test from 1 mb to $10^{-2}$ mb.

The characteristics of a turbomolecular pump set 7 comprising two stages in series with an intermediate inlet orifice 16 connected therebetween are given below by of example:

(A) First stage, connected to cell 1:
helium compression ratio: 1000
helium throughput: 20 l/s
nitrogen throughput: 50 l/s
two possible constructions:
  (1) 8 turbine (i.e. molecular drag) stages comprising two rows of fins at the inlet end inclined at 22°, then three stages inclined at 17°. and three outlet end stages at 15°: or
  (2) 1 Holweck pump stage.
(B) Second stage, connected to the primary pump 5:
nitrogen throughput: 100 l/s
nitrogen compression ratio: 100
helium compression ratio: 6
construction:
  4 turbine stages with the two inlet stages being inclined at 35° and the two outlet stages at 22°.

(l/s = liters per second)

I claim:

1. An installation for detecting a leak of a tracer gas, the installation comprising a mechanical primary pump whose inlet is connected firstly to a part under test via a first valve, and secondly to the outlet of a turbomolecular secondary pump via a second valve, with the inlet of said turbomolecular pump being connected to the part under test via a third valve, and with a spectrometer cell being also connected to the inlet side of said turbomolecular pump, wherein said turbomolecular pump is constituted by two stages in series, with the connection between the two stages having an intermediate inlet orifice connected thereto and also connected to the part under test via a fourth valve, with the first stage connected to the spectrometer cell having a high helium compression ratio, and with the second stage connected to the primary pump having a high nitrogen throughput.

2. A method of using an installation for detecting a leak according to claim 1, wherein the part under test is initially pre-evacuated down to about 1 mb by said mechanical primary pump, and wherein below 1 mb it is pumped out by said second stage of said turbomolecular pump in series with the mechanical primary pump.

* * * * *